(12) United States Patent
Kompella

(10) Patent No.: US 8,270,395 B2
(45) Date of Patent: Sep. 18, 2012

(54) FORMING MULTICAST DISTRIBUTION STRUCTURES USING EXCHANGED MULTICAST OPTIMIZATION DATA

(75) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1275 days.

(21) Appl. No.: 11/445,353

(22) Filed: Jun. 1, 2006

(65) Prior Publication Data

US 2007/0177593 A1      Aug. 2, 2007

Related U.S. Application Data

(60) Provisional application No. 60/763,236, filed on Jan. 30, 2006.

(51) Int. Cl.
*H04L 12/66* (2006.01)

(52) U.S. Cl. .......................... 370/353; 709/238

(58) Field of Classification Search ............... 370/329, 370/341, 338, 390, 432, 353; 455/518; 709/238, 709/232, 205
See application file for complete search history.

(56) References Cited

U.S. PATENT DOCUMENTS

| | | | |
|---|---|---|---|
| 5,600,642 | A | 2/1997 | Pauwels et al. |
| 6,374,303 | B1 | 4/2002 | Armitage et al. |
| 6,477,166 | B1 | 11/2002 | Sanzi et al. |
| 6,493,349 | B1 | 12/2002 | Casey |
| 6,501,754 | B1 | 12/2002 | Ohba et al. |
| 6,553,028 | B1 | 4/2003 | Tang et al. |
| 6,731,652 | B2 | 5/2004 | Ramfelt et al. |
| 6,751,218 | B1 | 6/2004 | Hagirahim et al. |
| 6,778,531 | B1 | 8/2004 | Kodialam et al. |
| 6,807,182 | B1 | 10/2004 | Dolphin et al. |
| 6,879,594 | B1 | 4/2005 | Lee et al. |
| 6,920,503 | B1 | 7/2005 | Nanji et al. |
| 7,035,226 | B2 | 4/2006 | Enoki et al. |
| 7,039,687 | B1 | 5/2006 | Jamieson et al. |
| 7,082,102 | B1 | 7/2006 | Wright |

(Continued)

FOREIGN PATENT DOCUMENTS

JP      2005-086222      3/2005

(Continued)

OTHER PUBLICATIONS

D. Awduche et al., "RFC 3209—RSVP-TE: Extensions to RSVP for LSP Tunnels," Network Working Group, Dec. 2001, 47 pgs.

(Continued)

*Primary Examiner* — Dang Ton
*Assistant Examiner* — Wei Zhao
(74) *Attorney, Agent, or Firm* — Shumaker & Sieffert, P.A.

(57) ABSTRACT

Network devices in a multicast network exchange multicast optimization data to improve efficiency of multicasting in the network. A protocol, e.g., a routing protocol or a multicast protocol, may be extended to allow the network devices to exchange the multicast optimization data. Alternatively, a separate protocol may be established for exchanging MOD. A network device may receive a message from an upstream device located between the device and a source for a multicast group, wherein the message includes multicast optimization data that specifies at least one criterion for selecting an upstream device. The device may use the data to intelligently select an optimal upstream device for receiving multicast using any of a variety of criteria to rank the upstream routers, such as minimization of multicast traffic duplication, load balancing current bandwidth levels, and avoiding paths experiencing communication delays.

27 Claims, 10 Drawing Sheets

U.S. PATENT DOCUMENTS

| | | | |
|---|---|---|---|
| 7,133,928 B2 | 11/2006 | McCanne | |
| 7,251,218 B2* | 7/2007 | Jorgensen | 370/235 |
| 7,269,135 B2 | 9/2007 | Frick et al. | |
| 7,281,058 B1 | 10/2007 | Shepherd et al. | |
| 7,330,468 B1 | 2/2008 | Tse-Au | |
| 7,333,491 B2 | 2/2008 | Chen et al. | |
| 7,359,328 B1 | 4/2008 | Allan | |
| 7,360,084 B1 | 4/2008 | Hardjono | |
| 7,366,894 B1 | 4/2008 | Kalimuthu et al. | |
| 7,418,003 B1 | 8/2008 | Alvarez et al. | |
| 7,463,591 B1 | 12/2008 | Kompella et al. | |
| 7,477,642 B2 | 1/2009 | Aggarwal et al. | |
| 7,483,439 B2 | 1/2009 | Shepherd et al. | |
| 7,532,624 B2* | 5/2009 | Ikegami et al. | 370/390 |
| 7,545,735 B1 | 6/2009 | Shabtay et al. | |
| 2002/0071390 A1 | 6/2002 | Reeves et al. | |
| 2002/0118644 A1 | 8/2002 | Moir | |
| 2002/0181477 A1 | 12/2002 | Mo et al. | |
| 2002/0186664 A1 | 12/2002 | Gibson et al. | |
| 2002/0191584 A1 | 12/2002 | Korus et al. | |
| 2003/0012215 A1 | 1/2003 | Novaes | |
| 2003/0021282 A1 | 1/2003 | Hospodor | |
| 2003/0031175 A1 | 2/2003 | Hayashi et al. | |
| 2003/0043772 A1* | 3/2003 | Mathis et al. | 370/338 |
| 2003/0056007 A1 | 3/2003 | Katsube et al. | |
| 2003/0063591 A1 | 4/2003 | Leung et al. | |
| 2003/0087653 A1 | 5/2003 | Leung et al. | |
| 2003/0088696 A1* | 5/2003 | McCanne | 709/238 |
| 2003/0099235 A1 | 5/2003 | Shin et al. | |
| 2003/0112748 A1 | 6/2003 | Puppa et al. | |
| 2003/0123446 A1 | 7/2003 | Muirhead et al. | |
| 2003/0172114 A1 | 9/2003 | Leung | |
| 2003/0177221 A1 | 9/2003 | Ould-Brahim et al. | |
| 2003/0191937 A1 | 10/2003 | Balissat et al. | |
| 2003/0210705 A1 | 11/2003 | Seddigh et al. | |
| 2004/0037279 A1 | 2/2004 | Zelig et al. | |
| 2004/0042406 A1 | 3/2004 | Wu et al. | |
| 2004/0047342 A1 | 3/2004 | Gavish et al. | |
| 2004/0081154 A1 | 4/2004 | Kouvelas | |
| 2004/0151180 A1 | 8/2004 | Hu et al. | |
| 2004/0151181 A1 | 8/2004 | Chu et al. | |
| 2004/0190517 A1 | 9/2004 | Gupta et al. | |
| 2004/0218536 A1 | 11/2004 | Yasukawa et al. | |
| 2004/0240445 A1 | 12/2004 | Shin et al. | |
| 2004/0240446 A1 | 12/2004 | Compton | |
| 2005/0001720 A1* | 1/2005 | Mason et al. | 340/539.13 |
| 2005/0018693 A1 | 1/2005 | Dull | |
| 2005/0027782 A1 | 2/2005 | Jalan et al. | |
| 2005/0097203 A1 | 5/2005 | Unbehagen et al. | |
| 2005/0108419 A1 | 5/2005 | Eubanks | |
| 2005/0111351 A1 | 5/2005 | Shen | |
| 2005/0169270 A1 | 8/2005 | Mutou et al. | |
| 2005/0220132 A1 | 10/2005 | Oman et al. | |
| 2005/0232193 A1* | 10/2005 | Jorgensen | 370/329 |
| 2005/0262232 A1 | 11/2005 | Cuervo et al. | |
| 2005/0265308 A1 | 12/2005 | Barbir et al. | |
| 2005/0271035 A1 | 12/2005 | Cohen et al. | |
| 2005/0271036 A1 | 12/2005 | Cohen et al. | |
| 2005/0281192 A1 | 12/2005 | Nadeau et al. | |
| 2006/0013141 A1 | 1/2006 | Mutoh et al. | |
| 2006/0039364 A1 | 2/2006 | Wright | |
| 2006/0047851 A1 | 3/2006 | Voit et al. | |
| 2006/0126496 A1 | 6/2006 | Filsfils et al. | |
| 2006/0147204 A1 | 7/2006 | Yasukawa et al. | |
| 2006/0153067 A1 | 7/2006 | Vasseur et al. | |
| 2006/0164975 A1 | 7/2006 | Filsfils et al. | |
| 2006/0182034 A1 | 8/2006 | Klinker et al. | |
| 2006/0221958 A1 | 10/2006 | Wijnands et al. | |
| 2007/0025277 A1 | 2/2007 | Sajassi et al. | |
| 2007/0036162 A1 | 2/2007 | Tingle et al. | |
| 2007/0076709 A1 | 4/2007 | Mattson et al. | |
| 2007/0091891 A1* | 4/2007 | Zwiebel et al. | 370/390 |
| 2007/0098003 A1 | 5/2007 | Boers et al. | |
| 2007/0124454 A1 | 5/2007 | Watkinson | |
| 2007/0140107 A1 | 6/2007 | Eckert et al. | |
| 2008/0056258 A1 | 3/2008 | Sharma et al. | |
| 2008/0123524 A1 | 5/2008 | Vasseur et al. | |
| 2008/0123654 A1 | 5/2008 | Tse-Au | |
| 2008/0291921 A1 | 11/2008 | Du et al. | |
| 2009/0028149 A1 | 1/2009 | Yasukawa et al. | |

FOREIGN PATENT DOCUMENTS

| | | |
|---|---|---|
| JP | 2005130258 A | 5/2005 |
| JP | 2005167482 A | 6/2005 |
| JP | 2005252385 A | 9/2005 |
| JP | 2005-323266 | 11/2005 |
| KR | 2004001206 | 1/2004 |
| WO | WO 02/091670 A2 | 11/2002 |
| WO | WO 2004/071032 A1 | 8/2004 |

OTHER PUBLICATIONS

RSVP-TE: Resource Reservation Protocol—Traffic Extension, Javvin Company, 2pgs., http://www.javvin.com/protocolRSVPTE.html, printed Aug. 16, 2006.

U.S. Appl. No. 11/056,383, entitled "Fast Reroute of Traffic Associated With a Point to Multi-Point Network Tunnel," filed Feb. 10, 2005.

U.S. Appl. No. 11/215,813, entitled "Point to Multi-Point Label Switched Paths With Label Distribution Protocol," filed Aug. 29.

U.S. Appl. No. 11/192,432, entitled "Transmission of Layer Two (L2) Multicast Traffic Over Multi-Protocol Label Switching Networks," filed Jul. 28, 2005.

U.S. Appl. No. 11/445,370, entitled "Forming Equal Cost Multipath for Multicast Distribution Structures," filed Jun. 1, 2006.

U.S. Appl. No. 11/212,509, entitled "Aggregate Multicast Trees for Multicast Virtual Private Networks," filed Aug. 26, 2005.

U.S. Appl. No. 11/212,500, entitled "Multicast Data Trees for Multicast Virtual Private Networks," filed Aug. 26, 2005.

U.S. Appl. No. 11/212,507, entitled "Reliable Exchange of Control Information for Multicast Virtual Private Networks," filed Aug. 26, 2005.

U.S. Appl. No. 11/213,636, entitled "Transport of Control and Data Traffic for Multicast Virtual Private Networks," filed Aug. 26, 2005.

U.S. Appl. No. 11/213,638, entitled "Shared Multicast Trees for Multicast Virtual Private Networks," filed Aug. 26, 2005.

U.S. Appl. No. 11/212,475, entitled "Label Switching Multicast Trees for Multicast Virtual Private Network," filed Aug. 26, 2005.

U.S. Appl. No. 11/212,932, entitled "Multicast Trees for Virtual Private Local Area Network (LAN) Service Multicast," filed Aug. 26, 2005.

U.S. Appl. No. 11/213,637, entitled "Aggregate Multicast Trees for Virtual Private Local Area Network (LAN) Service Multicast," filed Aug. 26, 2005.

U.S. Appl. No. 11/212,490, entitled "Multicast Data Trees for Virtual Private Local Area Network (LAN) Service Multicast," filed Aug. 26, 2005.

U.S. Appl. No. 11/213,639, entitled "Exchange of Control Information for Virtual Private Local Area Network (LAN) Service Multicast," filed Aug. 26, 2005.

U.S. Appl. No. 11/213,640, entitled "Auto-Discovery of Multicast Virtual Private Networks," filed Aug. 26, 2005.

U.S. Appl. No. 11/213,641, entitled "Inter-Autonomous System (AS) Multicast Virtual Private Networks," filed Aug. 26, 2005.

B. Zhang and H. Mouftah, "A Destination-initiated Multicast Routing Protocol for Shortest Path Tree Constructions," GLOBECOM 2003, IEEE Global Telecommunications Conference, XP010677629, pp. 2840-2844.

Aggarwal et al., "Establishing Point to Multipoint MPLS TE LSPs," submitted to Internet Engineering Task Force (IETF) Feb. 11, 2007, pp. 1-15.

Yasukawa et al. "Requirements for Point to Multipoint extension to RSVP-TE," IETF, Oct. 2003, pp. 1-20.

Atlas et al., "MPLS RSVP-TE Interoperability for Local Protection/Fast Reroute," IETF, Jul. 2001, pp. 1-14.

Eric C. Rosen et al., "Multicast in MPLS/BGP IP VPNs," draft-rosen-vpn-mcast-07.txt, May 2004, 27 pgs.

Steven Deering et al., "Protocol Independent Multicast-Sparse Mode (PIM-SM): Motivation and Architecture," draft-ietf-idmr-pim-arch-05.txt, Aug. 4, 1998, 30 pgs.

K. Kompella et al., "Virtual Private LAN Service," draft-ietf-l2vpn-vpls-bgp-00.txt, May 2003, 22 pgs.

Y. Rekhter et al., "A Border Gateway Protocol 4 (BGP-4)," Mar. 1995, 72 pgs.

L. Martini et al., "Transport of Layer 2 Frames Over MPLS," Network Working Group Internet Draft, draft-martini-l2circuit-trans-mpls-08.txt, Nov. 2001, 18 pgs.

L. Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pgs.

Fujita, N., "Dynamic Selective Replication Schemes for Content Delivery Networks," IPSJ SIG Notes, vol. 2001, No. 111, Information Processing Society of Japan, Nov. 21, 2001, 2 pgs.

Aggarwal et al., "MPLS Upstream Label Assignment for RSVP-TE and LDP," Aug. 24, 2005, http://www.tla-group.com/~mpls/ietf-63-mpls-upstream-rsvp-ldp.ppt, 8 pgs.

Aggarwal et al., "MPLS Upstream Label Assignment and Context Specific Label Space," Network Working Group Internet Draft, draft-raggarwa-mpls-upstream-label-00.txt, Jan. 2005, 9 pgs.

Wijnands et al., "Multicast Extensions for LDP," Network Working Group Internet Draft, draft-wijnands-mpls-ldp-mcast-ext-00.txt, Mar. 2005, 13 pgs.

Satyanarayana et al., "Extensions to GMPLS RSVP Graceful Restart", draft-aruns-ccamp-restart-ext-01.txt, Jul. 2004, Network Working Group Internet Draft, 12 pgs.

Office Action dated Jun. 26, 2009 for U.S. Appl. No. 11/445,370.

Responsive Amendment to Office Action dated Jun. 26, 2009 for U.S. Appl. No. 11/445,370, filed Sep. 28, 2009.

Office Action dated Dec. 22, 2008 for U.S. Appl. No. 11/445,370.

Responsive Amendment to Office Action dated Dec. 22, 2008 for U.S. Appl. No. 11/445,370, filed Mar. 23, 2009.

* cited by examiner

| DEVICE /106 | SOURCE /108 | GROUP /110 | NPU /112 | NPD /114 | JD /116 | NDD /118 | NNDD /120 |
|---|---|---|---|---|---|---|---|
| 10.1.1.2 | 224.0.1.195 | 1 | 2 | 0 | 0 | 0 | 0 |
| 10.1.1.2 | 224.0.1.195 | 2 | 2 | 0 | 0 | 0 | 0 |
| 10.1.1.2 | 224.0.1.200 | 1 | 1 | 2 | 1 | 1 | 1 |
| 10.1.1.6 | 224.0.1.195 | 1 | 2 | 2 | 1 | 1 | 1 |
| 10.1.1.6 | 224.0.1.195 | 2 | 2 | 2 | 0 | 1 | 1 |
| ••• | | | | | | | |
| 10.1.8.7 | 224.0.1.195 | 1 | 1 | 2 | 0 | 0 | 2 |

FIG. 6

FORMING MULTICAST DISTRIBUTION STRUCTURES USING EXCHANGED MULTICAST OPTIMIZATION DATA

This application claims the benefit of U.S. Provisional Application Ser. No. 60/763,236, filed Jan. 30, 2006, the entire content of which is incorporated herein by reference.

TECHNICAL FIELD

The invention relates to computer networks and, more particularly, to transmission of multicast content within a computer network.

BACKGROUND

A computer network is a collection of interconnected computing devices that exchange data and share resources. There are a number of approaches for communicating the data between the computing devices within the network. One approach, known as "multicasting," makes use of multicast trees allowing a source device to send a single data packet for distribution to a group of one or more recipient computing devices. With multicasting, the source device assigns a multicast identifier to the data, enabling each computing device of the group to receive a copy of the data. In some cases, the source device sends multicast packets over the network to a router configured for multicasting. In turn, the router replicates the packets and forwards copies of the packets to other multicast-enabled routers. The other routers, in turn, replicate the packets and repeat the forwarding process so that each of the recipient devices receives copies of the packets. In this manner, multicast packets are delivered through one or more networks using a multicast tree.

Consumers may switch between different multicast content provided by a content provider or multiple content providers by submitting "multicast action requests." In particular, the multicast action requests allow consumers to join and leave the various multicast groups associated with the multicast identifiers. An exemplary protocol for issuing multicast action requests, such as a join request, is the Internet Group Management Protocol (IGMP). To join a particular multicast group, receiving devices send multicast join requests to upstream (i.e., intermediate) routers, which in turn forward the join request to the source device.

SUMMARY

In general, the invention is directed to techniques for improving efficiency of multicast transmission in the network. According to the techniques, multicast recipient devices and intermediate devices exchange information to more intelligently select paths for multicast traffic. For example, using the exchanged information, referred to herein as multicast optimization data, the devices may select paths to minimize or reduce multicast traffic within a network. The techniques may be applied to extend an existing protocol, such as a routing protocol or a multicast protocol, to allow the network devices to exchange the multicast optimization data (MOD). Alternatively, a separate protocol may be established for exchanging MOD between neighboring devices.

In general, the exchange of MOD allows end-user receiver devices and the intermediate devices to form more optimal multicast distribution structures and sub-structures through the network. For example, in accordance with the techniques described herein, receiver devices that wish to join a multicast group and intermediate network devices may exchange multicast optimization messages containing MOD. A device, such as an end-user receiver device or an intermediate device, may use the MOD to more intelligently select an upstream intermediate network device through which to receive multicast traffic. For example, the device may use the MOD to select an upstream device that is already receiving multicast traffic for the multicast group of interest. These techniques may avoid unnecessary duplication of multicast packets in the network. As another example, the device may elect to utilize a different upstream device to load balance the multicast traffic within the network. Although described for exemplary purposes with respect to IP multicast, the principles of the invention may also be applied to building multicast trees in other environments, such as label distribution protocol (LDP), point-to-multipoint (P2MP), or multi-protocol label switching (MPLS) environments.

In one embodiment, a method of forming a multicast distribution structure within a network comprises receiving with a device a message from an upstream device located between the device and a source for a multicast group, wherein the message includes multicast optimization data that specifies at least one criterion for selecting an upstream device, and sending a join request from the device to a selected upstream device to join the multicast group in response to the received message.

In another embodiment, a method comprises sending with a device a message to one or more downstream devices located between the device and a receiver for a multicast group, wherein the message includes multicast optimization data that specifies at least one criterion for selecting an upstream device, and receiving a join request from at least one of the downstream devices to join the multicast group in response to the sent message.

In another embodiment, a network device comprises an interface to receive a message from an upstream device, wherein the message contains multicast optimization data (MOD) that specifies at least one criterion for selecting an upstream device. The network device also includes a control unit to generate an appropriate multicast action request with respect to a multicast distribution structure within a network based on the MOD, wherein the interface outputs the multicast action request to at least one device in the network.

In a further embodiment, a system comprises a first network device to generate a first message containing first multicast optimization data (MOD) that specifies at least one criterion for selecting an upstream device, and communicate the first message to a second network device via a protocol. The system also includes a second network device to receive the first message, generate a second message containing second MOD that specifies at least one criterion for selecting an upstream device, and communicate the second message to the first network device via the protocol. The first network device receives the second message and issues an appropriate multicast action request based on the first and second MOD.

In yet another embodiment, a computer-readable medium comprises instructions for causing a programmable processor to receive messages containing multicast optimization data pertaining to a plurality of upstream devices for a multicast group, wherein the multicast optimization data specifies at least one criterion for selecting an upstream device. The instructions further cause the programmable processor to issue an appropriate multicast action request based on the data.

The details of one or more embodiments of the invention are set forth in the accompanying drawings and the descrip-

BRIEF DESCRIPTION OF DRAWINGS

FIG. 6 is a block diagram illustrating an example data structure storing multicast optimization data.

DETAILED DESCRIPTION

Figure 1A:
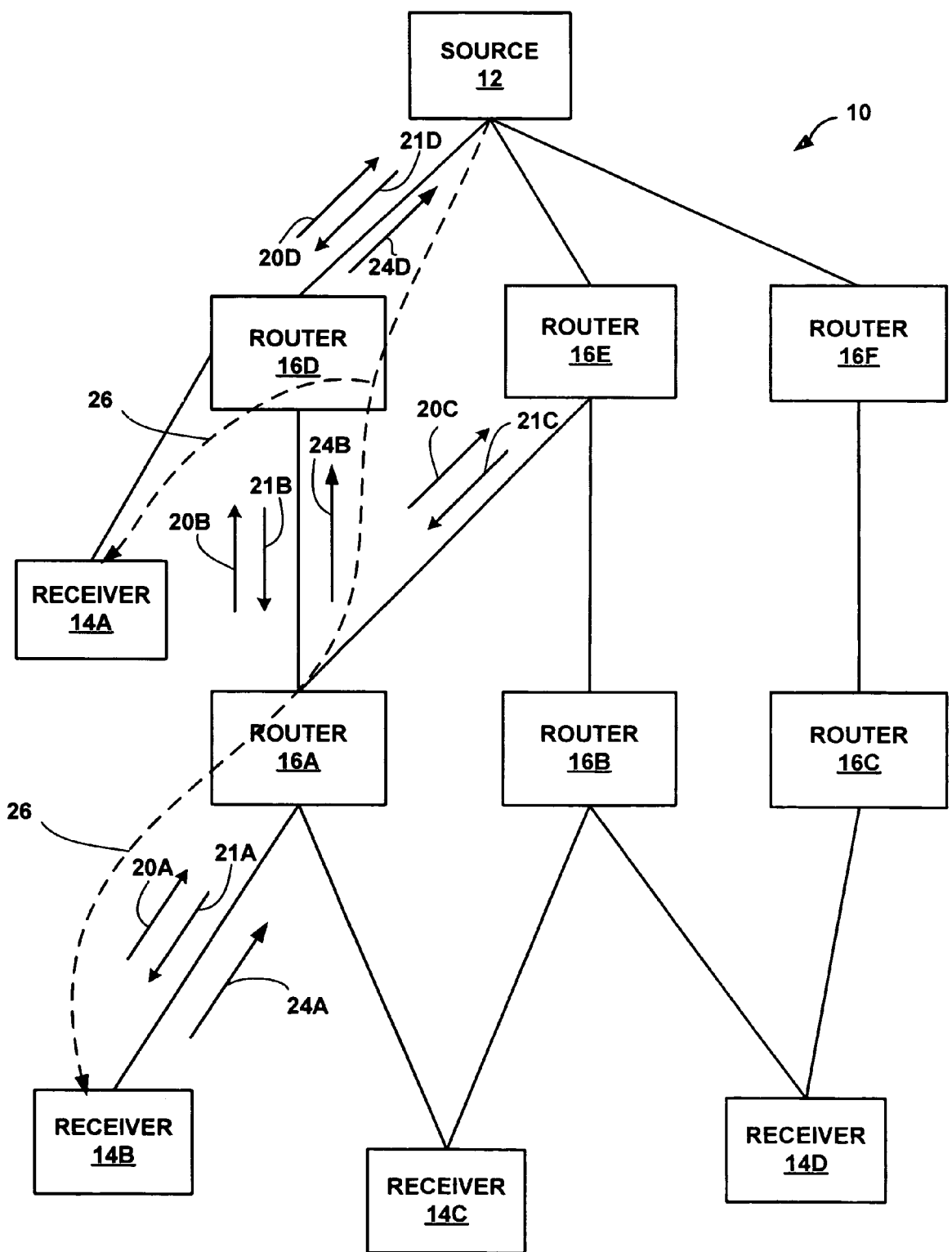
FIGS. 1A-1D are a series of block diagrams illustrating an example system in which receiver devices and intermediate routers exchange multicast optimization data (MOD) and select upstream routers for receiving multicast traffic in a manner consistent with the principles of the invention.

FIG. 1A is a block diagram illustrating an example system 10 in which receivers 14A-14D (collectively, receivers 14) select one or more routers for receiving multicast traffic from a source device 12 in a manner consistent with the principles of the invention. Source device 12 provides content, such as Internet Protocol (IP) video services, IP television (IPTV), desktop conferences, corporate broadcasts, or other content, to receivers 14. For example, source device 12 may provide content in the form of multicast data packet streams to one or more multicast groups that receivers 14 have joined. Each multicast data packet includes a multicast identifier that identifies the respective multicast group. Routers 16A-16F (collectively, routers 16) may maintain information associating the receivers 14 with the multicast groups, and transmit copies of the multicast data packets from source device 12 to the receivers 14.

The invention will be described for exemplary purposes with respect to using IP multicast to build multicast trees. However, the techniques may also be applied to building multicast distribution structures in other environments, such as label distribution protocol (LDP), point-to-multipoint (P2MP), or multi-protocol label switching (MPLS) environments. For example, a multicast stream may be sent over a label switched path (LSP), e.g., a P2MP LSP, as described in "Point to Multi-Point Label Switched Paths with Label Distribution Protocol," U.S. application Ser. No. 11/215,813, filed Aug. 29, 2005, the entire content of which is incorporated herein by reference.

The configuration of system 10 illustrated in FIG. 1A is merely exemplary. For example, system 10 may include additional source devices (not shown). In general, source device 12 represents any source of multicast content, such as a video server. Moreover, receivers 14 may include any type of device capable of receiving multicast content, such as personal computers, laptop computers, handheld computers, workstations, servers, digital televisions, network-enabled cell phones and the like.

Receivers 14 may interact with routers 16 via the Internet Group Management Protocol (IGMP) or some other multicasting protocol to issue multicast action requests. Receivers 14 may, for example, issue a join or leave multicast action request to join or leave a multicast group, respectively. For example, receivers 14 may issue multicast join requests to become members of the exemplary multicast group for which routers 16 deliver multicast data packets. As another example, one of receivers 14 may issue a multicast leave action request (also called a "prune" action request) to leave a group, thereby terminating content delivery from its respective router 16. In a similar manner, receivers 14 may issue multicast action requests to routers 16 to switch between multicast groups, allowing receivers 14 to access different content provided by source device 12.

In accordance with the principles of the invention, receivers 14 and routers 16 may exchange messages containing information with respect to the multicast groups of which they are members, and the number of upstream or downstream devices to which they are connected that are either capable of or already providing multicast content for the groups. Receivers 14 as well as routers 16 may use this information to intelligently select an "upstream" router to which to issue a multicast join request. In making the decision, the receiving device may monitor conditions of system 10 and utilize any of a variety of criteria to rank the upstream routers 16, such as minimization of multicast traffic duplication, load balancing current bandwidth levels, and avoiding paths experiencing communication delays.

Whether a router is an "upstream" router between a receiver and a source depending on the embodiment, and the embodiments may utilize different criteria for defining "upstream" routers. For example, in one embodiment, a router is considered an upstream router for a given receiver and a given source if the distance from the source to the particular router is less than the distance from the source to the receiver, where the distances are determined according to the Internet Gateway Protocol (IGP) metric. According to another embodiment, a router is considered an upstream router for the receiver and the source if the distance from the router to the source is less than the distance from the destination to the source. This definition may provide different results than the first definition since the IGP metric between two devices may be non-symmetric. Yet another embodiment add an additional requirement that an upstream router must be on the shortest path from the particular router to the source (or from the source to the router, respectively), as defined by IGP metrics. Moreover, a given router may both an upstream router in some contexts and a downstream router in other contexts, depending on its relationship to a given source and receiver.

In the example of FIG. 1A, assume system 10 currently has a single multicast stream 26 originating from source 12 and delivered only to receiver 14A. In addition, assume receiver 14B wishes to join the exemplary multicast group <SOURCE 12, GROUP I> associated with multicast stream 26. Consequently, receiver 14B initially sends a multicast optimization (MO) packet 20A to every upstream router to which receiver 14B is connected, i.e., router 16A. MO packet 20A may, for example, inform router 16A as to the number of upstream routers to which receiver 14B is connected, as well as the number of upstream routers from which receiver 14B could receive multicast traffic for the particular source and group <SOURCE 12, GROUP 1> associated with multicast stream 26.

In this example, router 16A is the only upstream router associated with receiver 14B, so MO packet 20A would inform router 16A that receiver 14B has only a single upstream router for receiving multicast traffic for the group <SOURCE 12, GROUP 1>. MO packet 20A may also inform router 16A how many downstream devices receiver 14B has that may potentially join a group, and how many downstream devices receiver 14B has that are already members of a group. Here, receiver 14B has no such downstream devices in either category. When router 16A receives MO packet 20A, router 16A may save the information contained within the packet to a database as multicast optimization data (MOD).

In response, router 16A sends an MO reply packet 21A to receiver 14B. MO reply packet 21A may, for example, inform receiver 14B as to the number of dependent and non-dependent downstream devices router 16A has, and whether any dependent devices have already joined the multicast group. The term dependent downstream device is used to refer to a device that is dependent upon the router, i.e., the router is the only upstream router from which the downstream device can receive a multicast stream. The term non-dependent downstream device is used to refer to a device that may potentially receive a multicast stream from the router for a group, but that is also connected to other upstream routers from which the downstream device may receive the multicast stream.

In this case, MO reply packet 21A informs receiver 14B that router 16A has a single dependent downstream device (i.e., receiver 14B), one non-dependent downstream device (i.e., receiver 14C), and zero joined downstream devices. Router 16A may have previously been made aware that receiver 14C is a non-dependent downstream device by a similar MO packet 20 (not shown) received from receiver 14C. In this manner, receiver 14B learns whether any peer devices downstream of router 16A have already joined the multicast group, and whether the peer devices may be dependent upon router 16A to receive multicast traffic in the future.

When receiver 14C receives the MO reply packet 21A, receiver 14C may save the multicast optimization data contained within the packet to a data structure. In addition, receiver 14C sends a join request 24A to router 16A to request to join the multicast group <SOURCE 12, GROUP I> associated with multicast stream 26.

Before or after receiver 14B has issued join request 24A to join the group, router 16A sends MO packets 20B, 20C to routers 16D and 16E, respectively. MO packets 20B, 20C may indicate that router 16A has two potential upstream routers from which router 16A could receive multicast traffic for the particular source and group of interest. MO packets 20B, 20C may also indicate that router 16A has two downstream devices (i.e. receivers 14B, 14C) and one downstream device that has joined the particular <S, G> (i.e., receiver 14B). In some embodiments, router 16A may send MO packets 20B, 20C even before receiver 14B has joined the group.

In response, routers 16D and 16E each send MO reply packets 21B, 21C, respectively, to router 16A. MO reply packet 20B indicates that router 16D has two downstream devices (i.e., receiver 14A and intermediate router 16A), one of which has already joined the group (i.e., receiver 14A). MO reply packet 21C indicates that router 16E has two downstream devices, none of which have joined the group. Based on this information, router 16A may intelligently form a multicast sub-tree. For example, as shown in FIG. 1A, router 16A may select router 16D as the upstream router from which router 16A will receive the multicast stream 26 for the <SOURCE 12, GROUP 1>, since router 16D is already receiving multicast traffic for that group from source 12. In this manner, the routers may avoid unnecessary duplication of multicast packets in system 10. As another example, router 16A may select router 16E for load balancing purposes.

Assuming router 16A selects router 16D, router 16A sends a join request 24B to the selected router 16D. Router 16D may likewise send a MO packet 20D to source device 12, receive a MO reply packet 21D from source device 12, and send a join request 24D to source device 12. Source device 12 sends multicast stream 26 for group <S, G> to router 16D, which duplicates the stream 26 and sends packets to both receiver 14A and router 16A. Router 16A then sends multicast stream 26 to receiver 14B. In one embodiment, multicast stream 26 may be sent over a label switched path (LSP), e.g., a point-to-multipoint (P2MP) LSP.

In this manner, multicast optimization data (MOD) is propagated upstream and downstream to local devices to allow downstream devices to intelligently select optimal upstream devices for a particular multicast group, thereby forming optimal multicast distribution structures (e.g., trees and sub-trees) and increasing the efficiency of multicasting within system 10. The MO packets 20, 21 may be sent as an extension to an existing routing protocol, e.g., Open Shortest Path First (OSPF), or an existing multicast protocol, such as IGMP, Protocol-Independent Multicast (PIM), Distance Vector Multicast Routing Protocol (DVMRP), Multicast OSFP (MOSFP), or Multicast Transport Protocol (MTP), or as a separate protocol specifically designed for exchanging MOD. The devices may send the MO packets periodically, only when a change has occurred to the multicast optimization data, or in response to multicast action requests.

For example, the multicast optimization data may indicate one or more of a number of other devices downstream from the respective upstream device that have already joined the multicast group, a number of dependent downstream devices for which the upstream device is the only potential upstream device that can provide the multicast data for the multicast group, a number of non-dependent downstream devices capable of receiving the multicast data from the upstream device or at least one other upstream device, a number of potential upstream devices, a number of potential downstream devices. As other examples, the MOD may indicate a distance from a source of the multicast group to the respective upstream device, a distance to the source from the respective upstream device, a delay from the source to the respective upstream device, a number of multicast groups transiting the upstream device, and a total multicast bandwidth transiting the upstream device.

Figure 1B:
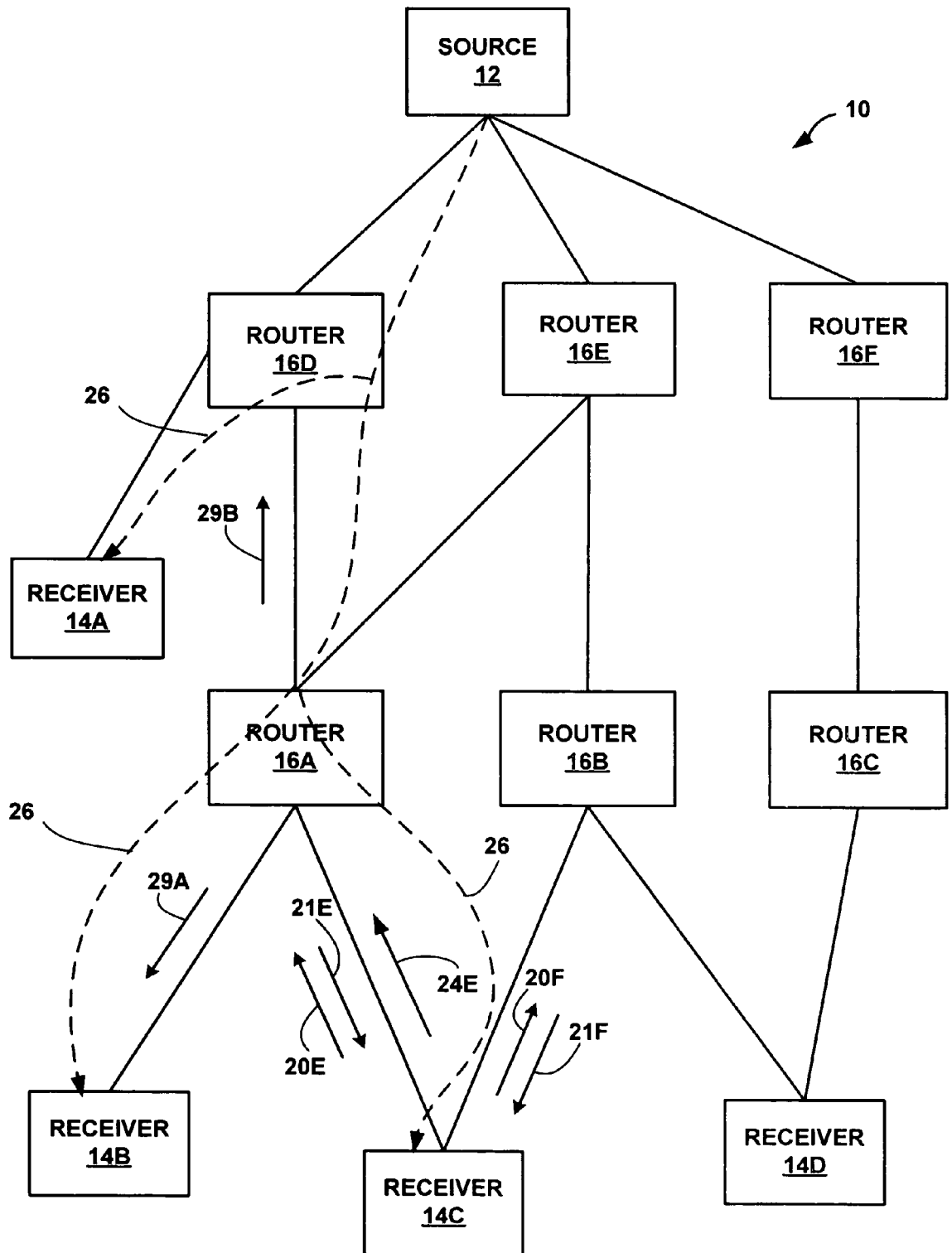

With respect to FIG. 1B, assume that receiver 14C subsequently wishes to receive multicast content associated with multicast stream 26. As illustrated in FIG. 1B, receiver 14C sends MO packets 20E, 20F to upstream devices 16A and 16B, respectively. MO packets 20E, 20F may indicate that receiver 14C has two potential upstream devices from which receiver 14C could receive multicast traffic for group <SOURCE 12, GROUP 1>. MO packets 20E, 20F may also indicate that receiver 14C has zero potential downstream devices and zero joined downstream devices.

In response, routers 16A and 16B may each send MO reply packets 21 E, 21 F, respectively, to receiver 14C. MO reply packet 21E indicates that router 16A has one downstream device that has already joined the group (i.e., receiver 14B). MO reply packet 21 F indicates that router 16B has no downstream devices having already joined the group. Based on this information, receiver 14C may intelligently select an upstream router from which receiver 14C will receive the multicast stream for the group. In this example, receiver 14C selects router 16A because router 16A is already receiving multicast traffic for the group. In this manner, the upstream routers may avoid unnecessary duplication of multicast packets in system 10. Alternatively, receiver 14C may have utilized other criteria as described above.

Assuming receiver 14C selects router 16A, receiver 14C sends a join request 24E to router 16A. Router 16A adds receiver 14C as a joined downstream device, and proceeds to duplicate the multicast stream 26 for the particular <S, G> associated with multicast data stream 26 to send copies of the packets to both receivers 14B and 14C. In some embodiments, router 16A may send an MO update message 29A to receiver 14B and an MO update message 29B to router 16D, indicating that router 16A now has two joined downstream devices for the particular <S, G>.

Figure 1C:
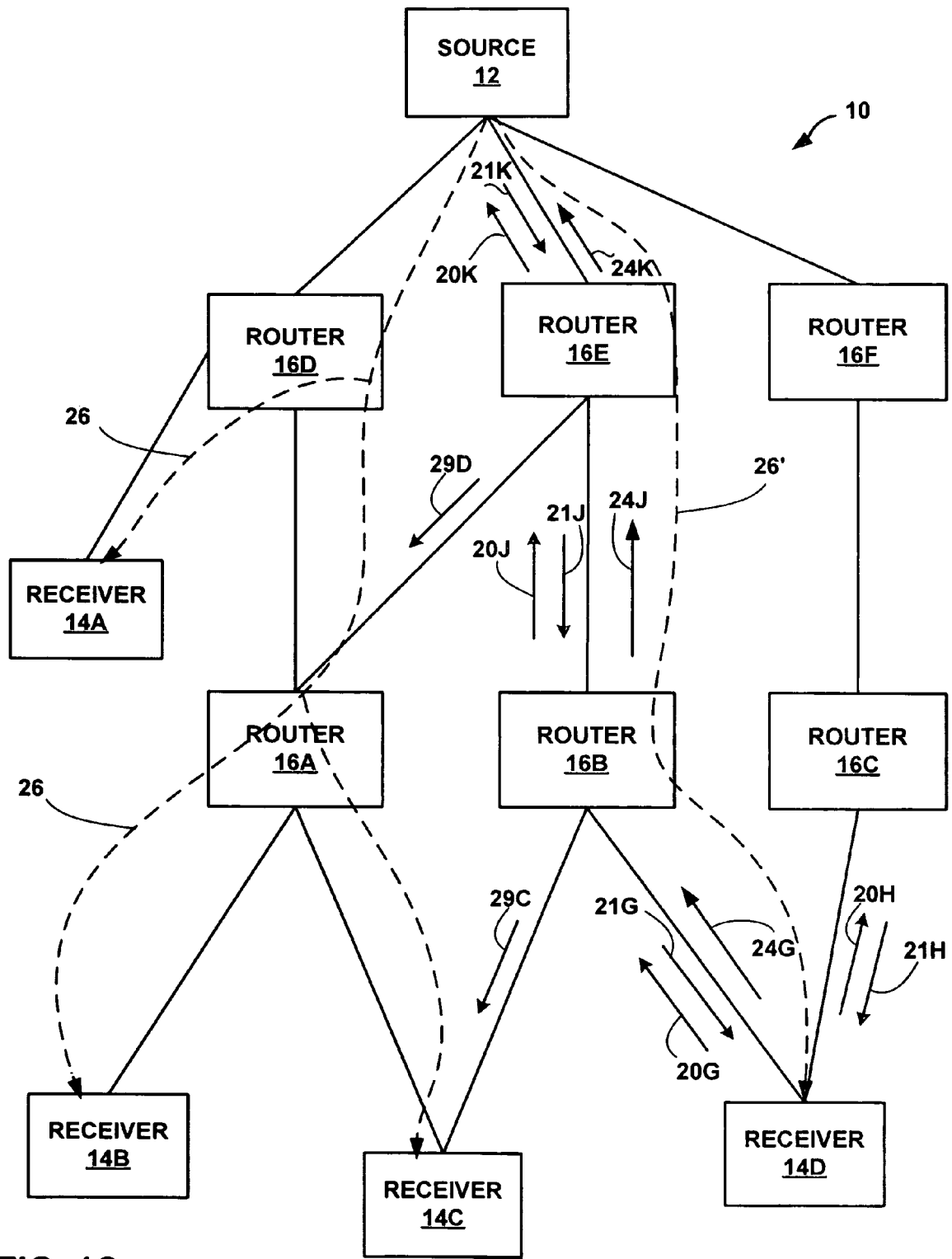

With respect to FIG. 1C, assume that receiver 14D subsequently wishes to receive multicast content associated with multicast stream 26. As illustrated in FIG. 1C, receiver 14C sends MO packets 20G, 20H to routers 16B and 16C, respectively. MO packets 20G, 20H may indicate that receiver 14D has two potential upstream devices from which receiver 14D could receive multicast content for group <SOURCE 12, GROUP 1>. MO packets 20G, 20H may also indicate that receiver 14D has zero potential downstream devices and zero joined downstream devices.

In response, or previously, routers 16B and 16C may send MO reply packets 21G, 21H, respectively, to receiver 14D. MO reply packet 21G indicates that router 16B has a downstream device (i.e., receiver 14C) that has already joined the particular group of interest through an upstream router other than router 16B. MO reply packet 21 H indicates that router 16C has no downstream devices having already joined the group.

Based on this information, receiver 14D may intelligently select router 16B as the upstream router from which receiver 14D will receive the multicast stream for the group. In addition, receiver 14D may also consider information about other groups having multicast streams (not shown) going through routers 16B and 16C, and select an upstream router so as to provide load balancing to system 10. In this example, receiver 14D sends a join request 24G to router 16B.

Router 16B may send MO update message 29C to receiver 14C indicating that router 16B now has a joined downstream device for the group <SOURCE 12, GROUP 1>. Receiver 14C may save the information contained within MO update message 29C as multicast optimization data in a database. Router 16B may propagate the MO information and join request upstream to router 16E, in a manner similar to that discussed above with respect to router 16A in FIG. 1A. When router 16E receives the join request 24J from router 16B, router 16E may send an MO update message 29D to router 16A indicating that router 16B now has a joined downstream device for the group <SOURCE 12, GROUP 1>. Router 16E propagates the information upstream and sends a join request 24K to source 12. Source device 12 then sends multicast stream 26' for the group <SOURCE 12, GROUP 1> to router 16E, which sends multicast stream 26' to router 16B. Router 16B then sends multicast stream 26' to receiver 14D.

Figure 1D:
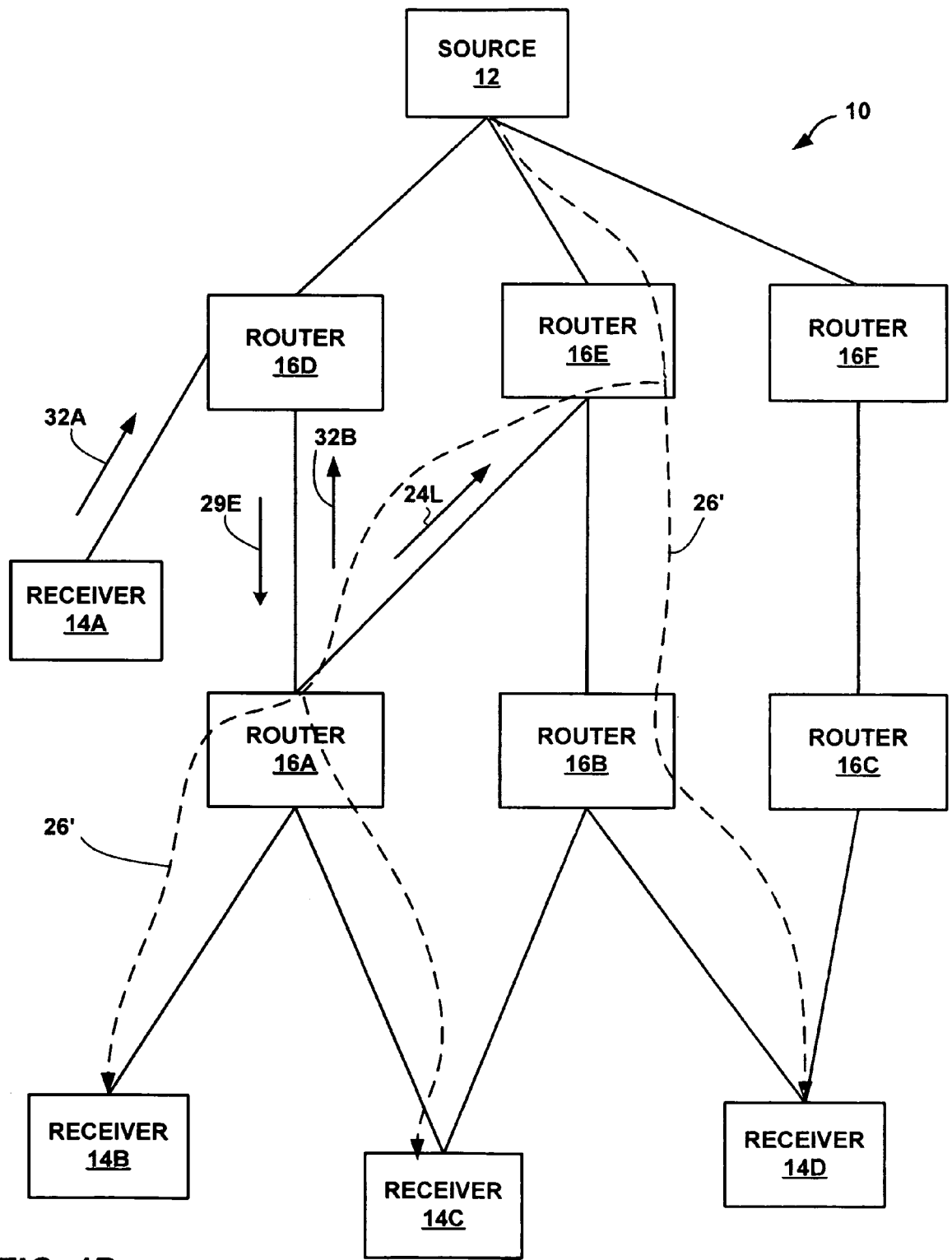

With respect to FIG. 1D, assume that receiver 14A subsequently leaves the multicast group <SOURCE 12, GROUP 1>. As illustrate in FIG. ID, receiver 14A sends a leave request 32A to router 16D to request to leave multicast group <SOURCE 12, GROUP 1>. Router 16D removes receiver 14A from the group, and stops sending the multicast stream to receiver 14A.

In addition, router 16D sends an MO update message 29E to router 16A, indicating that router 16D now only has one downstream device that is a member of group <SOURCE 12, GROUP 1>. With respect to this particular multicast group, router 16A may intelligently use this information to switch upstream routers from router 16D to router 16E based on MO update message 29D from router 16E (FIG. 1C) indicating that router 16E is receiving a multicast stream 26' for the same group <SOURCE 12, GROUP 1>. Router 16A may therefore send a leave request 32B to router 16D to request to leave the group, and may send a join request 24L to router 16E to join the group. Router 16E adds router 16A as a downstream device in the group, and sends multicast stream 26' to router 16A, resulting in the new multicast tree illustrated in FIG. 1D.

Figure 2A:
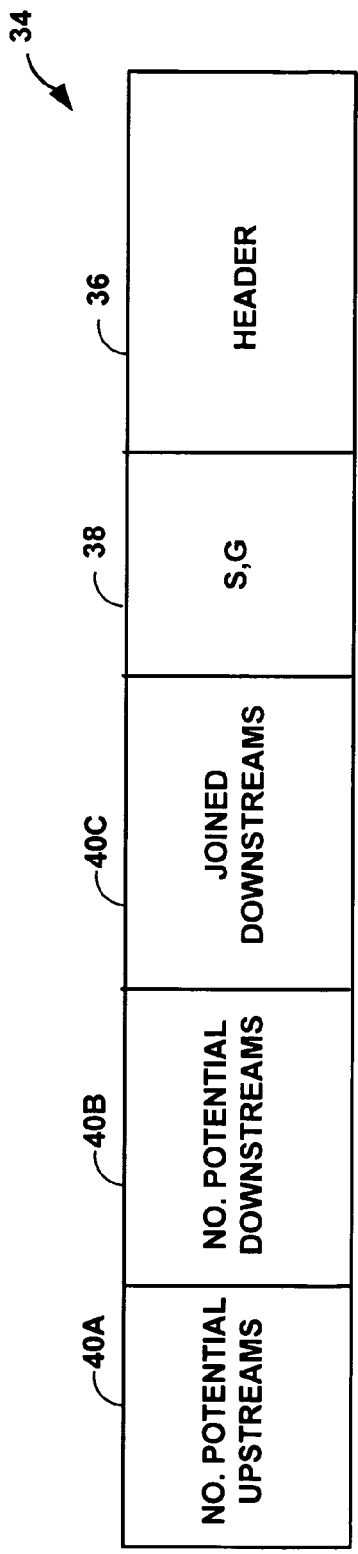
FIG. 2A is a block diagram illustrating an exemplary packet format for use by a downstream device in sharing multicast optimization data with an upstream device in a system to improve multicasting efficiency.

FIG. 2A is a block diagram illustrating an exemplary format for a multicast optimization packet 34 for use by a downstream device in sharing multicast optimization data with an upstream device. Packet 34 may be a packet used by an extended multicast protocol or an extended routing protocol. Alternatively, packet 34 may be used by a separate protocol designed for multicast optimization. A downstream device may, for example, send packet 34 to all of its upstream devices in anticipation of joining a group <S,G> to share multicast optimization data (MOD) with and obtain MOD about neighboring devices. In this way the downstream device may intelligently select an upstream device to which to send a join request to join the particular multicast group.

In the example of FIG. 2A, packet 34 contains a header 36 containing typical packet source and destination information. For example, header 36 may contain IP addresses, ports, protocol or other information. Packet 34 also contains a group identification field 38 ("ID") that contains a group identifier, for example, the source device and the group number that identifies the respective multicast group to which the subsequent data applies. As another example, the group identifier may be a multicast address.

MOD fields 40A-40C (collectively, MOD fields 40) contain information that a downstream device may share to help optimize multicast transmission. For example, MOD field 40A contains a number of upstream devices to which a downstream device is connected and from which the downstream device could potentially receive multicast traffic for the specific multicast group. MOD field 40B contains the number of downstream devices connected to the downstream device sending packet 34 that may potentially issue joins to receive multicast traffic for the multicast group. MOD field 40C contains a number of devices downstream to the device sending packet 34 that have actually joined the particular multicast group. The MOD fields 40 shown are merely exemplary, and other types of multicast optimization data may be included in packet 34. Moreover, this or other information for multiple multicast groups may be conveyed in a single packet.

Figure 2B:
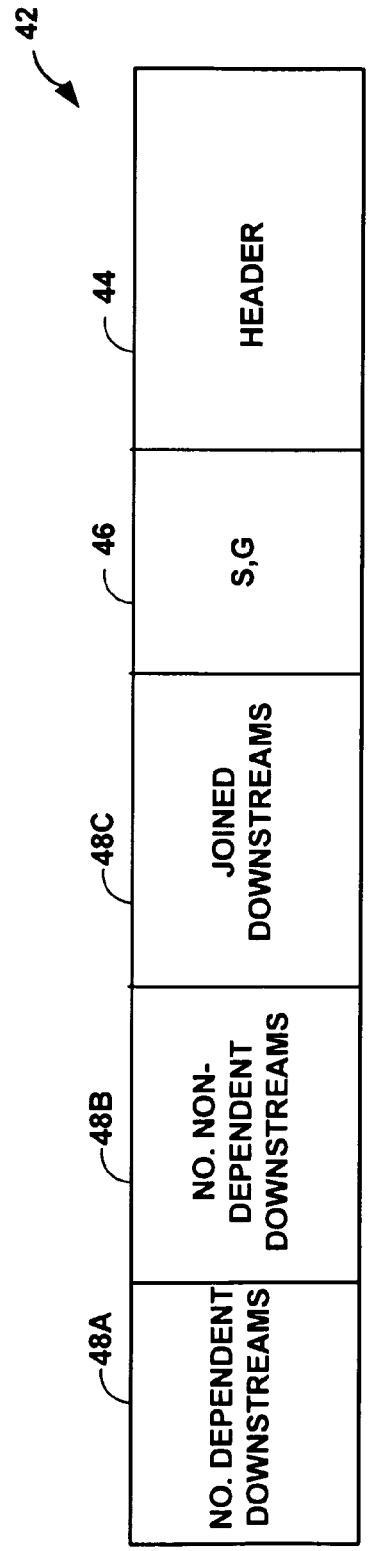
FIG. 2B is a block diagram illustrating an exemplary packet format for use by an upstream device in sharing multicast optimization data with a downstream device in a system to improve multicasting efficiency.

FIG. 2B is a block diagram illustrating an exemplary multicast optimization reply packet 42 for use by an upstream device in sharing multicast optimization data with a downstream device. The receipt of packet 34 (FIG. 2A) from a downstream device may trigger the receiving upstream device to send a corresponding reply packet 42 containing other MOD about neighboring devices of the upstream device. Alternatively, an upstream device may send reply packet 42 periodically, as configured by an administrator, or in response to multicast action requests. Regardless, the upstream device may communicate multicast optimization information to neighboring devices via one or more packets conforming to the format of packet 34 to increase efficiency in multicasting.

Reply packet 42 contains a header 44 indicating the source and destination information for the reply packet, and a group ID field 46 that identifies a particular multicast group at issue. MOD fields 48A-48C (collectively, MOD fields 48) contain information that an upstream device may share to aid the selection and formation of optimal multicast trees within a network. In this example, MOD field 48A contains the number of downstream devices for which the upstream device sending packet 42 is the only upstream device able to deliver multicast traffic for the identified multicast group (i.e., dependent downstream devices). MOD field 48B contains the number of downstream devices that may potentially receive a multicast stream from the upstream router, but that are also connected to other upstream routers from which to receive the multicast stream for the multicast group (i.e., non-dependent downstream devices). MOD field 48C contains the number of devices downstream to the device sending packet 42 that have actually joined the multicast group. The MOD fields 48 shown are merely exemplary, and other types of multicast optimization data may be included in packet 42. Moreover, this or other information for multiple multicast groups may be conveyed in a single packet.

Figure 3:
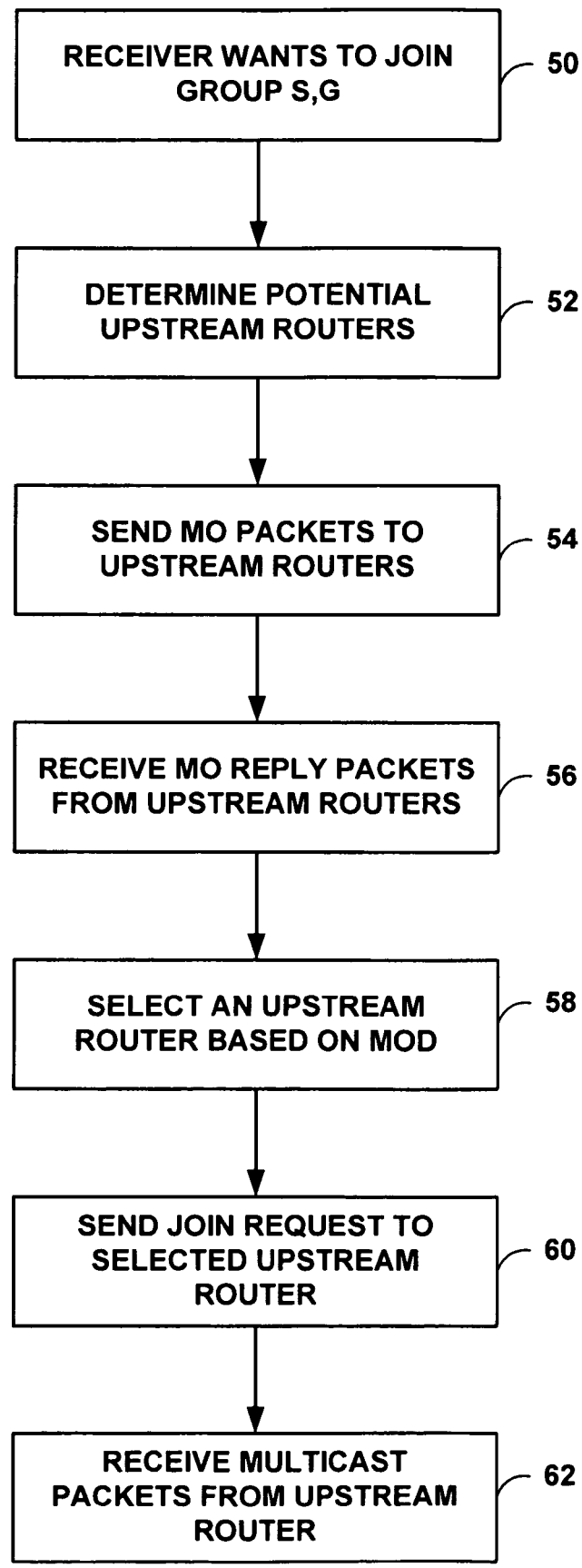
FIG. 3 is a flowchart illustrating example operation of a receiver in sharing multicast optimization data with neighboring upstream routers.

FIG. 3 is a flowchart illustrating example operation of a receiver, such as any of receivers 14 of FIGS. 1A-1D, in sharing multicast optimization data with neighboring upstream routers. FIG. 3 will be described with respect to receiver 14C.

Initially, receiver 14C desires to receive a multicast stream for group <S,G> (typically in response to a user request), causing receiver 14C to join the group (50). Receiver 14 determines potential upstream routers (52), depending on the appropriate definition of "upstream." In some embodiments, receiver 14 may calculate a shortest path to the source device. There may be multiple paths that have an equal cost metric to the source, and receiver 14C may use MOD to choose between the shortest paths. Alternatively, receiver 14C may not calculate a shortest path, and instead may consider all potential paths to the source device. In any case, receiver 14C will need to decide to which upstream router to send a join request.

Receiver 14C sends a multicast optimization (MO) packet 34 (FIG. 2A) to each of the upstream routers on all paths to the source or a subset based on a cost metric or length, i.e., to upstream routers 22A and 22B (54). Receiver 14C then receives a MO reply packet 42 (FIG. 2B) from each of the upstream routers (56). Receiver 14C may save the multicast optimization data contained within the MO reply packets to a database. Receiver 14C selects an upstream router based on the multicast optimization data (58). For example, receiver 14C may consider whether an upstream router is already receiving multicast traffic for the group. As another example, receiver 14C may utilize any of a variety of criteria to rank the routers 16, such as minimization of multicast traffic duplication, load balancing current bandwidth levels, and avoiding paths experiencing communication delays. Receiver 14C sends a join request to the selected upstream router (60) and receives multicast packets from the selected upstream router (62).

Figure 4:
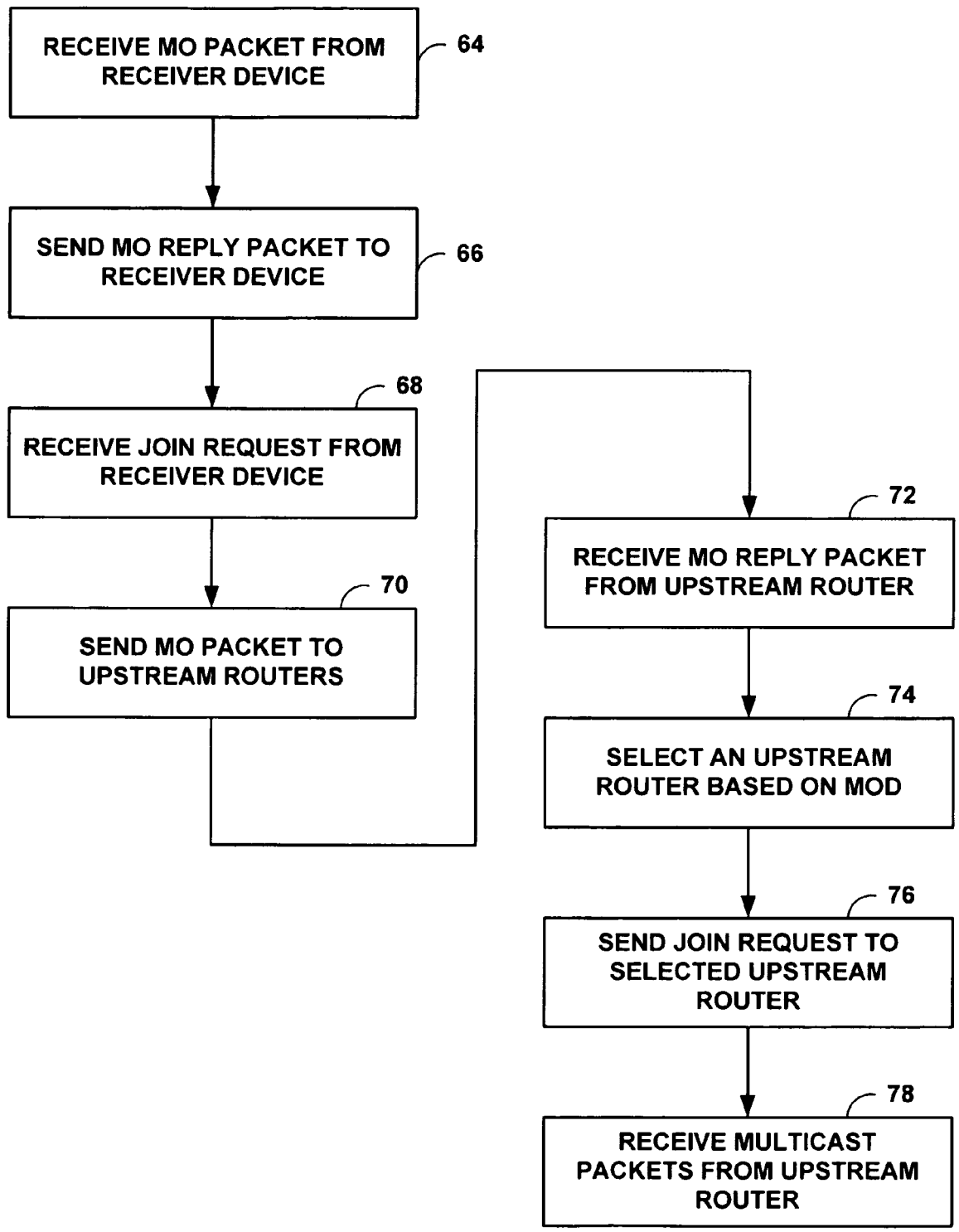
FIG. 4 is a flowchart illustrating example operation of an upstream router in sharing multicast optimization data with neighboring devices.

FIG. 4 is a flowchart illustrating example operation of an upstream router, such as any of routers 16 of FIGS. 1A-1D, in sharing multicast optimization data with neighboring devices. FIG. 4 will be described with respect to router 16A. Router 16A may receive an MO packet 34 (FIG. 2A) from one or both of receivers 14B and 14C (64). For example, router 16A may receive an MO packet from receiver 14B indicating that receiver 14B has only one upstream router for this group, i.e., that receiver 14B is dependent on router 16A to receive multicast content for the respective group. Router 16A may also receive an MO packet from receiver 14C indicating that receiver 14C has two potential upstream routers for this group.

Router 16A sends an MO reply packet 42 (FIG. 2B) to one or both of receivers 14B and 14C (66). The MO reply packet 42 may indicate, for example, that router 16A has one dependent downstream device, and one non-dependent downstream device. Router 16A is thus sharing the MO data received from each of its downstream devices with all of the other downstream devices. In this manner, router 16A facilitates the exchange of information in system 10, so that downstream devices may intelligently select an optimal upstream router for receiving multicast.

Router 16A may receive a join request from a receiver (68). If router 16A is not already receiving multicast packets for the requested group, router 16A may propagate the MO data and join requests to the next upstream device. In some embodiments, router 16A may optionally calculate the shortest path to the source device. Router 16A may send MO packets 34 to other routers upstream of router 16A, i.e., routers 16D and 16E (70), and may receive MO reply packets 42 from routers 16D and 16E (72). Router 16A may select an upstream router from which to receive the multicast content for the group based on the received multicast optimization data (74), send a join request to the selected upstream router (76), and receive multicast packets from the selected upstream router (78).

Figure 5:
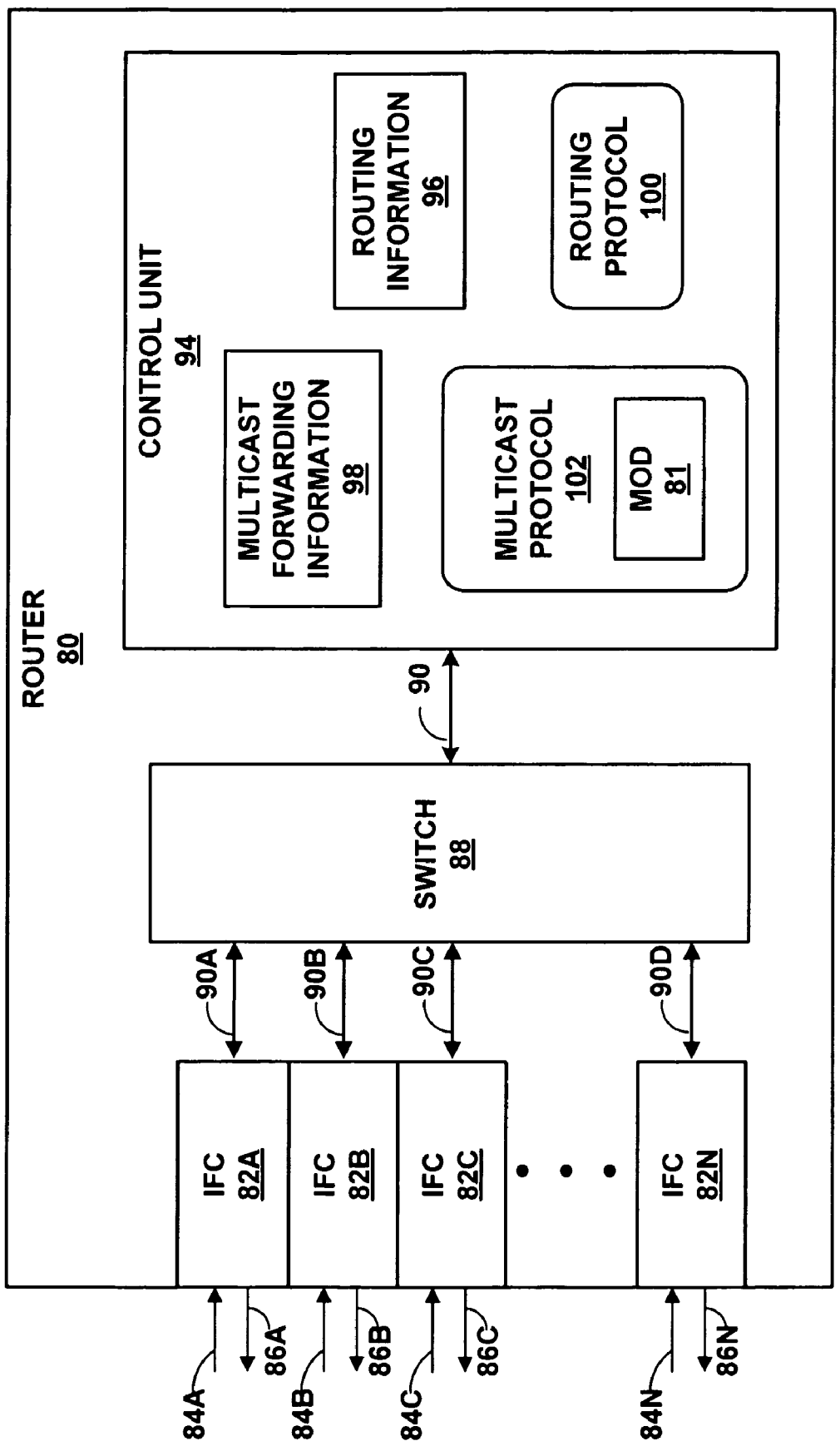
FIG. 5 is a block diagram illustrating an exemplary router that distributes or receives multicast optimization data in accordance with an embodiment of the invention.

FIG. 5 is a block diagram illustrating an exemplary router 80 that stores, distributes, and receives multicast optimization data (MOD) 81 in accordance with an embodiment of the invention. Router 80 may operate substantially similar to routers 16 in FIGS. 1A-1D. In some cases, router 80 may be an edge router and receivers 14 may connect to router 80 via network switches, e.g., DSLAMs or Ethernet switches. Alternatively, router 80 may be an intermediate router that is not directly connected to receivers 14. In general, router 80 is capable of receiving and sending MO packets and MO reply packets containing MOD 81.

In the illustrated embodiment, router 80 includes interface cards 82A-82N ("IFCs 82") that receive packets on inbound links 84A-84N ("inbound links 84") and send packets on outbound links 86A-86N ("outbound links 86"). IFCs 82 are interconnected by a high-speed switch 88 and links 90. In one example, switch 88 comprises switch fabric, switchgear, a configurable network switch or hub, and the like. Links 90 comprise any form of communication path, such as electrical paths within an integrated circuit, external data busses, optical links, network connections, wireless connections, or other type of communication path. IFCs 82 are coupled to inbound links 84 and outbound links 86 via a number of interface ports (not shown).

Router 80 also includes a control unit 94 that maintains routing information 96 to reflect the current topology of a network and other network entities to which router 80 is connected. In general, when router 80 receives a unicast packet via one of inbound links 84, control unit 94 determines a destination for the packet in accordance with routing information 96 and outputs the packet on one of outbound links 86 based on the destination.

Control unit 94 further maintains multicast forwarding information 98. When router 80 receives a multicast packet via one of inbound links 84, control unit 94 forwards the packet on a set of outbound links 86 in accordance with multicast forwarding information 98. Control unit 94 provides an operating environment for routing protocol 100, e.g., OSPF, LDP, MPLS, IGP, and multicast protocol 102, e.g., IGMP. Router 80 may use multicast protocol 102 to send and receive multicast action requests, e.g., join and leave requests. In other embodiments, other protocols may be executed within control unit 94.

One or both of routing protocol 100 and multicast protocol 102 may be, for example, extended in a manner that allows multicast optimization data 81 to be conveyed to and received from other devices for optimizing multicasting. As described herein, the protocol extension allows a variable number of MOD fields to be communicated to other devices. In other embodiments, a separate protocol may be established for exchanging MOD 81. For example, a number of potential upstream devices, a number of potential downstream devices, a number of joined downstream devices, a number of dependent downstream devices, a number of non-dependent downstream devices, or other MOD may be specified in accordance with the techniques described herein.

In the example of FIG. 5, multicast protocol 102 maintains MOD 81. Router 80 may use multicast protocol 102 or routing protocol 100 to send MOD packets via one of outbound links 86 and receive MOD reply packets via one of inbound links 84 containing MOD, or to send and receive MO update messages. When router 80 sends an MOD packet, which may be similar to MOD packet 34 of FIG. 2A, router 80 may fill the fields of the MOD packet with data from MOD 81. When router 80 receives an MOD reply packet, which may be similar to MOD reply packet 42 of FIG. 2B, router 80 may save the information contained within the fields of the MOD reply packet to MOD 81. Control unit 94 maintains routing information 98, multicast forwarding information 98, and MOD 81 in the form of one or more tables, databases, link lists, radix trees, databases, flat files, or any other data structures.

In operation, router 80 applies MOD 81 when determining an upstream router to send a join request for a particular group. In particular, when router 80 needs to join a group, router 80 may send and receive MOD packets and MOD reply packets containing MOD 81 to learn about multicast content actually or potentially being transmitted to neighboring devices for the group. Router 80 may use the MOD 81 to determine which upstream router to send the join request. More specifically, router 80 may consider whether multicast content for the group is already being received by one of the upstream routers. Router 80 may also use MOD 81 to allow for load-balancing considerations in selecting an upstream router for receiving multicast content.

The architecture of router 80 illustrated in FIG. 5 is shown for exemplary purposes only. The invention is not limited to this architecture. In other embodiments, router 80 may be configured in a variety of ways. In one embodiment, for example, control unit 94 and its corresponding functionality may be distributed within IFCs 82. In another embodiment, control unit 94 may include a routing engine that performs routing functions and maintains a routing information base (RIB), e.g., routing information 96, and a forwarding engine that performs packet forwarding based on a forwarding information base (FIB) generated in accordance with the RIB.

Control unit 94 may be implemented solely in software, or hardware, or may be implemented as a combination of software, hardware, or firmware. For example, control unit 94 may include one or more processors that execute software instructions. In that case, the various software modules of control unit 94, such as routing protocol 100 and multicast protocol 102, may comprise executable instructions stored on a computer-readable medium, such as computer memory or hard disk.

FIG. 6 is a block diagram illustrating an example data structure 104 storing multicast optimization data. In the example of FIG. 6, example data structure 104 is maintained by the control unit of receiver 14C. For example, data structure 104 may be similar to MOD 81 maintained by control unit 94 of FIG. 5. Receiver 14C may populate the rows and columns of data structure 104 using MOD received in MO packets. Data structure 104 includes device column 106, which indicates the network device for which MOD is stored in the corresponding row. Data structure 104 also includes a source column 108 and multicast group column 110, which together indicate the multicast group <S,G>.

Column 112 of data structure 104 stores the number of potential upstream devices ("NPU") that the corresponding device has, while column 114 stores the number of potential downstream devices ("NPD") that the corresponding device has. Column 116 stores the number of joined downstream devices ("JD") that the corresponding device has, column 118 stores the number of dependent downstream devices ("NDD") that the corresponding device has, and column 120 stores the number of non-dependent downstream devices ("NNDD") that the corresponding device has. When receiver 14C receives an MO message, e.g., an MO packet, an MO reply packet, or an MO update message, the control unit of receiver 14C may enter a new row or update an existing row in data structure 104.

In the example of FIG. 6, the first three rows correspond to device 10.1.1.2, which in this example is the IP address for receiver 14C. The fourth and fifth rows correspond to device 10.1.1.6 (the IP address for router 16A), and the last row corresponds to device 10.1.8.7 (the IP address for router 16B). The first row corresponds to multicast source 224.0.0.195 (the multicast address for source device 12), group 1, and the second row corresponds to source 224.0.0.195, group 2. <Source 12, group 1> is the multicast group discussed in FIGS. 1A-1D. The third row corresponds to source 224.0.0.200, another multicast source device (not shown in FIGS. 1A-1D).

In the example of FIG. 6, receiver 14C maintains MOD about itself in data structure 104. For example, for <Source 12, group 1> and <Source 12, group 2>, receiver 14C has two potential upstream devices, zero potential downstream devices, and consequently zero joined downstream devices, zero dependent downstream devices, and zero non-dependent downstream devices.

Receiver 14C also obtains MOD from routers 16A and 16B via MO reply packets sent to receiver 14C by routers 16A and 16B in response to MO packets. Receiver 14C saves this MOD to data structure 104. For example, receiver 14C has stored in the fourth row that for <Source 12, group 1>, router 16A has two potential upstream devices, two potential downstream devices, one joined downstream device, one dependent downstream device, and one non-dependent downstream device. As another example, receiver 14C has stored in the last row that for <Source 12, group 1>, router 16B has one potential upstream devices, two potential downstream devices, zero joined downstream devices, zero dependent downstream devices, and two non-dependent downstream devices.

Data structure 104 of FIG. 6 is merely exemplary. Other types of MOD not shown in example data structure 104 may be stored by receiver 14C. As explained above, although illustrated in the form of a table, data structure 104 may be maintained in the form of one or more tables, databases, link lists, radix trees, databases, flat files, or any other data structures.

Figure 7:
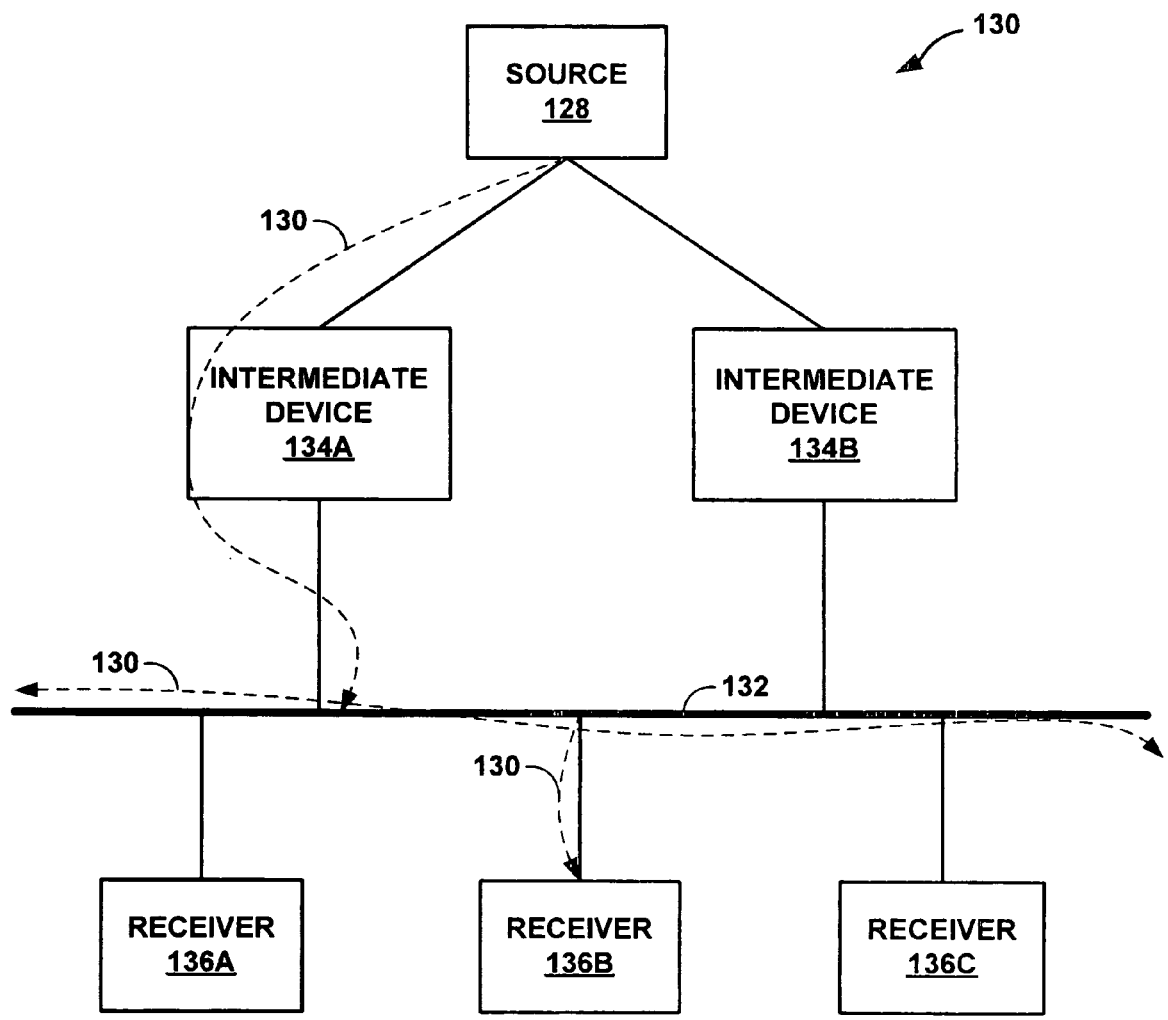
FIG. 7 is a block diagram illustrating a local area network (LAN) environment, in which a source device injects a multicast data stream for a group into a backbone via one or more intermediate devices.

FIG. 7 is a block diagram illustrating a local area network (LAN) environment 126, in which a source device 128 injects a multicast data stream 130 for a group into backbone 132 via one or more of intermediate devices 134A-134B (collectively, intermediate devices 134). Receivers 136A-136C (collectively, receivers 136) may access and share multicast data stream 130 flowing on backbone 132. The principles of the invention described herein may readily be applied to LAN environment 126. For example, receiver 136B may send MOD packets to and receive MOD reply packets from neighboring devices to obtain MOD. Receiver 136B may use the MOD to more intelligently select an upstream router to use for joining the group. For example, in this case receiver 136B may select intermediate device 134A to send a join request to, since source 128 is already sending multicast data stream 130 to intermediate device 134A. In this manner, source 128 need not inject duplicate data streams into LAN environment 126.

Various embodiments of the invention have been described. These and other embodiments are within the scope of the following claims.

The invention claimed is:

1. A method of forming a multicast distribution structure within a network comprising:
receiving with a device a respective message from two or more different upstream devices located between the device and a source for a multicast group,
wherein each of the messages includes respective multicast optimization data that at least indicates whether the respective upstream device already receives multicast traffic for the multicast group;
ranking at least two of the two or more different upstream devices based on one or more criteria applied to the multicast optimization data;
selecting one of the two or more different upstream devices to which to send a join request for the multicast group based on the ranking; and
sending the join request for the multicast group from the device to the selected upstream device to join the multicast group in response to the received messages.

2. The method of claim 1,
wherein the criteria for ranking the upstream devices includes one or more of minimization of multicast traffic duplication for the multicast group within the network, load balancing the multicast traffic within the network, and selecting a network path experiencing shorter communication delays.

3. The method of claim 1, wherein the multicast optimization data indicates at least one of a number of other devices downstream from the respective upstream device that have already joined the multicast group, a number of dependent downstream devices for which the upstream device is the only potential upstream device that can provide the multicast data for the multicast group, a number of non-dependent downstream devices capable of receiving the multicast data from the upstream device or at least one other upstream device, a number of potential upstream devices, a number of potential downstream devices, a distance from a source of the multicast group to the respective upstream device, a distance to the source from the respective upstream device, a delay from the source to the respective upstream device, a number of multicast groups transiting the upstream device, and a total multicast bandwidth transiting the upstream device.

4. The method of claim 1, wherein receiving with the device the message from the upstream device comprises receiving a reply packet from the upstream device.

5. The method of claim 1, wherein receiving with the device the message from the upstream device comprises receiving an update packet from the upstream device.

6. The method of claim 1, wherein the device comprises an intermediate device having a plurality of downstream devices, the method further comprising:
receiving with the device a message from at least one downstream device, wherein the message includes multicast optimization data that specifies a criterion for selecting an upstream device; and
outputting messages relaying the multicast optimization data to the other downstream devices.

7. The method of claim 1, wherein receiving a message comprises receiving the message using one of an extended routing protocol or an extended multicast protocol.

8. The method of claim 1, wherein receiving with the device the message from the upstream device comprises receiving a message that identifies the multicast group and the source.

9. The method of claim 1, further comprising:
in response to receiving each of the messages from the different upstream devices, generating a message containing the multicast optimization data from each of the messages; and
communicating the generated message to the other one of the upstream devices.

10. The method of claim 1, wherein the device comprises an end-user receiving device or an intermediate device.

11. The method of claim 1, wherein selecting one of the different upstream devices comprises selecting one of the upstream devices already receiving multicast content for the multicast group based on the received multicast optimization data.

12. The method of claim 1, further comprising sending a leave request to the non-selected upstream devices to leave the multicast group prior to issuing the join request to the selected upstream device.

13. The method of claim 1, further comprising storing the data to a data structure,
wherein the data structure includes entries for pairs of multicast groups and sources for different upstream and downstream devices, and
wherein each entry stores the multicast optimization data.

14. A network device comprising:
an interface to receive a respective message from at least two different upstream devices located between the network device and a source for a multicast group,
wherein each of the messages contains respective multicast optimization data (MOD) that at least indicates whether the respective upstream device already receives multicast traffic for the multicast group; and
a control unit to rank at least two of the two or more different upstream devices based on one or more criteria applied to the multicast optimization data, and to select one of the different upstream devices to which to
send an appropriate multicast action request for the multicast group based on the ranking and
generate the appropriate multicast action request with respect to a multicast distribution structure within a network based on the ranking,
wherein the interface outputs the multicast action request to the selected upstream device.

15. The network device of claim 14, wherein the control unit maintains a data structure storing the MOD.

16. The network device of claim 14, wherein the received MOD indicates at least one of a number of other devices downstream from the respective upstream device that have already joined the multicast group, a number of dependent downstream devices for which the upstream device is the only potential upstream device that can provide the multicast data for the multicast group, a number of non-dependent downstream devices capable of receiving the multicast data from the upstream device or at least one other upstream device, a number of potential upstream devices, a number of potential downstream devices, a distance from a source of the multicast group to the respective upstream device, a distance to the source from the respective upstream device, a delay from the source to the respective upstream device, a number of multicast groups transiting the upstream device, and a total multicast bandwidth transiting the upstream device.

17. The network device of claim 14, wherein the control unit generates a message containing at least some of the stored MOD, and wherein the interface communicates the message to a routing device in accordance with a protocol.

18. The network device of claim 17, wherein the protocol is one of a multicast protocol and a routing protocol.

19. The network device of claim 14,
wherein the appropriate multicast action request comprises a join request, and
wherein the interface communicates the join request to the selected upstream device, and receives multicast content for the multicast group from the selected upstream device.

20. A system comprising:
a first network device to generate a first message containing first multicast optimization data (MOD) that specifies at least one criterion for selecting an upstream device to which to send an appropriate multicast action request for a multicast group, and communicate the first message to a second network device via a protocol; and
the second network device to receive the first message, generate a second message containing second MOD that at least indicates whether the respective upstream device already receives multicast traffic for the multicast group, and communicate the second message to the first network device via the protocol,
wherein the first network device receives the second message,
ranks at least two of the two or more different upstream devices based on one or more criteria applied to the multicast optimization data;
selects one of a plurality of potential upstream devices based on the first and second MOD, and
issues the appropriate multicast action request for the multicast group based on the ranking.

21. The system of claim 20, wherein the multicast action request is one of a multicast join request and a multicast leave request.

22. The system of claim 20, wherein the protocol comprises one of a multicast protocol and a routing protocol.

23. The system of claim 20, wherein the multicast action request comprises a join request for the multicast group, wherein the first network device communicates the join request to the selected upstream device, and receives multicast content for the multicast group from the selected upstream device.

24. The system of claim 20, wherein the system comprises a local area network (LAN).

25. A non-transitory computer-readable medium comprising instructions for causing a programmable processor to:
receive a respective message from at least two different upstream devices for a multicast group,
wherein each of the messages includes respective multicast optimization data pertaining to a plurality of upstream devices for the multicast group, and
wherein the multicast optimization data at least indicates whether the respective upstream device already receives multicast traffic for the multicast group;
rank at least two of the two or more different upstream devices based on one or more criteria applied to the multicast optimization data;
select one of the different upstream devices from which to receive multicast content for the multicast group based on the ranking; and
issue the appropriate multicast action request for the multicast group to the selected upstream device based on the ranking.

26. The non-transitory computer-readable medium of claim 25, wherein the instructions cause the processor to:
communicate a join request for the multicast group to the selected upstream device; and
receive the multicast content for the multicast group from the selected upstream device.

27. A method comprising:
prior to joining a multicast group, determining, with a device, a plurality upstream devices located between the device and a source for the multicast group;
sending, with the device, a respective message to at least two different upstream devices of the plurality of upstream devices, wherein each of the multicast optimization messages specifies a first set of multicast optimization data that includes information about the plurality of upstream devices;
receiving with the device a respective reply message from the at least two different upstream devices, wherein each of the reply messages includes a respective second set of multicast optimization data that at least indicates whether the respective upstream device already receives multicast traffic for the multicast group;
ranking at least two of the two or more different upstream devices based on one or more criteria applied to the multicast optimization data;
selecting one of the different upstream devices to which to send a join request for the multicast group based on the ranking;
sending the join request for the multicast group from the device to the selected upstream device to join the multicast group in response to the received response messages; and
receiving, with the device, multicast packets for the multicast group from the selected upstream device.

* * * * *